United States Patent Office 3,564,904
Patented Feb. 23, 1971

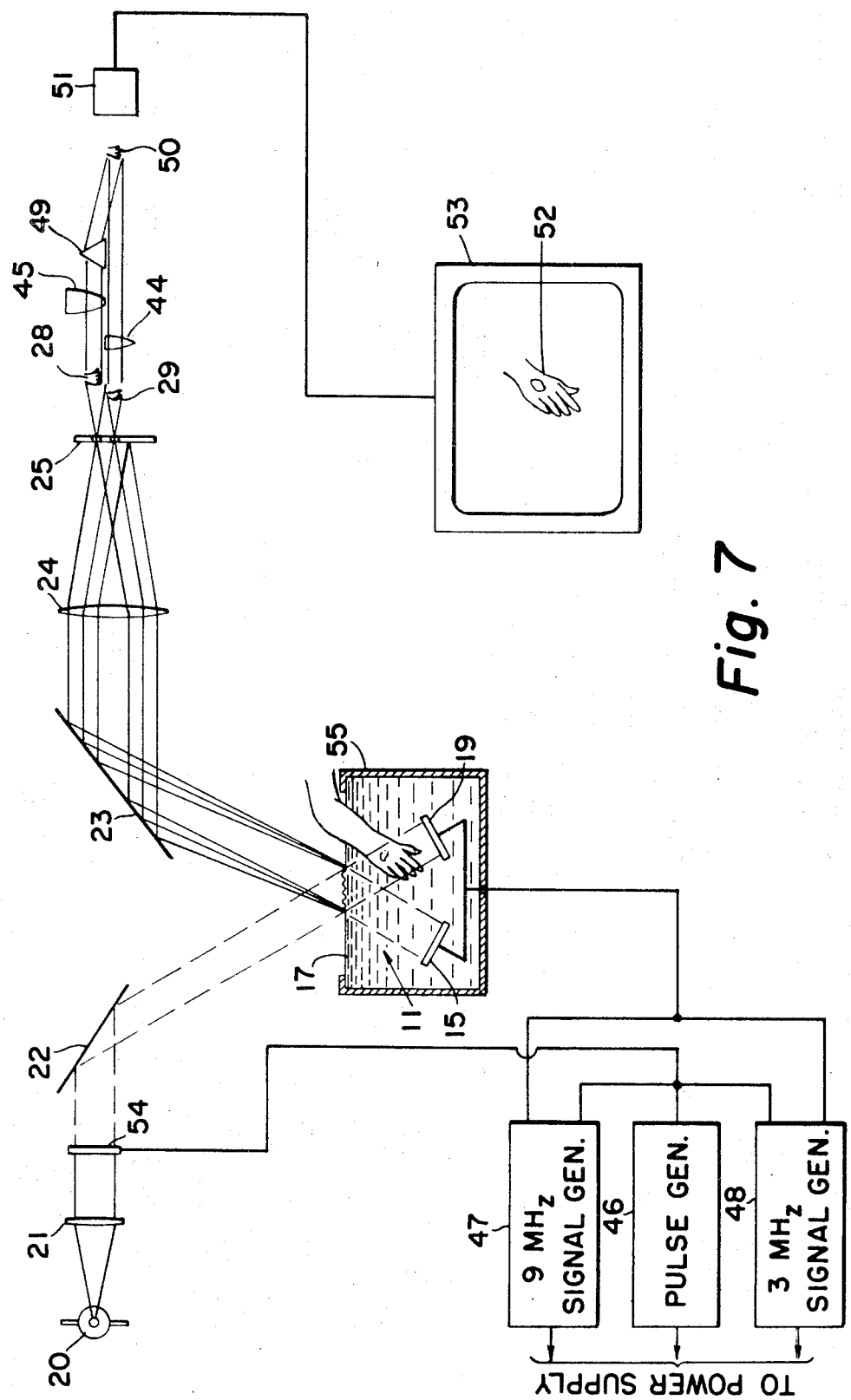

3,564,904
ULTRASONIC HOLOGRAPHY WITH COLOR RENDITION
Byron B. Brenden, Richland, Victor I. Neeley, Kennewick, and David R. Hoegger, Richland, Wash., assignors to Holotron Corporation, Wilmington, Del., a corporation of Delaware
Continuation-in-part of application Ser. No. 667,242, Sept. 12, 1967. This application Dec. 18, 1967, Ser. No. 691,253
Int. Cl. G01n 29/04
U.S. Cl. 73—67.5
20 Claims

ABSTRACT OF THE DISCLOSURE

A form of ultrasonic holography in which multiple holograms are formed at the ultrasonic detector surface by utilizing ultrasonic beams of different frequencies. An image may be reconstructed with light from each hologram formed by directing the light to the ultrasonic hologram and by viewing with suitable optics the diffracted images. By causing each image from each hologram to be rendered in different color light and by bringing into register the different colored images, a multicolored image may be viewed.

RELATED APPLICATIONS

This application is a continuation-in-part of copending application Ser. No. 667,242, filed Sept. 12, 1967, and now abandoned, which in turn is a continuation-in-part of copending application Ser. No. 606,368, filed Dec. 30, 1966, and now abandoned.

BACKGROUND OF THE INVENTION

Field of the invention

This invention resides in the field of ultrasonic holograph and more specifically, relates to methods and apparatus for producing ultrasonic holograms capable of rendering multiple images in different colors.

Description of the prior art

The invention of ultrasonic holography by Brenden, which invention forms the subject matter of copending application Ser. No. 569,914, filed Aug. 3, 1966, represented a significant advance in the field of ultrasonic examining and testing. Prior to that invention, the art of nondestructive testing and inspecting utilizing compressional waves had evolved from pulse-echo techniques which yielded a one dimensional display to an ultrasonic camera in which a sonic wave was sent through an object under inspection and then was detected to form a two dimensional sonic representation of the object. This type of ultrasonic camera suffered from the fact that in order to obtain accurate sonic images, the object had to be positioned precisely and accurately with respect to the compressional wave. Additionally, the detecting means required was generally found to be very costly.

Ultrasonic holography or wavefront reconstruction using compressional wave interference patterns enables the production of low cost and dimensionally accurate two and perhaps even three dimensional images of objects under inspection.

Briefly described, the invention of ultrasonic holography involves the utilization of at least two beams of compressional waves, one of which is caused to pass through the object under inspection, and both of which are caused to interfere with each other at an interface between two fluids, thereby creating a standing wave interference pattern. This interference pattern comprises a hologram which can be used to directly reconstruct a visible image of the object being tested or which can be photographed to produce a permanent hologram.

In the broadest sense of the invention of ultrasonic holography, the sonic frequencies utilized are not limited to any particular range, but rather include the entire spectrum of compressional wave energy. However, in more practical embodiments of that invention, it has been found that the higher sonic frequencies, i.e., those considerably above the audible range, are much more desirable than the lower frequencies. For this reason, instead of utilizing the more general term "compressional wave energy" the term "ultrasonic energy" will be utilized in the following description. This should, however, in no way limit the scope of the invention.

The principles of ultrasonic holography as described in the referred to Brenden patent application are important in understanding the present invention and will therefore be summarized hereinafter. However, in order to more fully understand the principles of ultrasonic holography, direct reference should be made to the referred to copending patent application.

The present invention represents an improved technique of ultrasonic holography and resides in the rendition of multiple, different colored images from ultrasonic holograms. A very good example of a situation in which multiple images in different colors is advantageous is in the case of the inspection of objects which present different degrees of sonic transparency. Such an object may be a part of the human body, like a foot or a hand, that includes both light, fleshy, tissue and hard bone. In inspecting such objects, difficulties may be encountered due to the fact that the hard parts of the object may be relatively opaque to short wavelength ultrasonic energy, whereas the softer less dense portions of the object may be readily penetrated by relatively short wavelength ultrasonic frequencies. However, since the resolution of the object depends upon the wavelength, it is apparent that resolution may be sacrificed if longer wavelength, better penetrating ultrasonic energy is used. By means of this invention, two or more images of an object may be formed with two or more different ultrasonic frequencies, each frequency being chosen for either its transmittance or resolving ability. The images may be subsequently brought into register to form a resultant image that exhibits the desirable characteristics of each ultrasonic frequency being utilized. By rendering each image in different colors, the different portions of the object may be readily distinguished. Thus, an ultrasonic image of a human finger, formed according to this invention, may comprise a red bone, rendered from an ultrasonic hologram made with relatively long wavelength ultrasonic energy, and yellow surrounding tissue, rendered from an ultrasonic hologram made with relatively short wavelength ultrasonic energy. In view of the fact that X-rays (heretofore the best medical diagnostic device of its kind) are hampered by radiation danger, the importance of the present invention is tremendous indeed.

It is, therefore, an object of this invention to produce ultrasonic holograms capable of forming multiple images.

It is another object of this invention to produce ultrasonic holograms capable of forming multiple images in different colors.

It is still another object of this invention to produce holograms capable of forming multiple images in different colors and for permanently recording such holograms.

It is a further object of this invention to produce a multicolored composite image of an object.

It is a still further object of this invention to produce a system for monitoring ultrasonic images of objects, which objects display varying degrees of transparency to ultrasonic energy.

SUMMARY OF THE INVENTION

Briefly, my invention resides in the utilization of beams of ultrasonic energy, at least one of which includes an object under inspection, which beams include at least two distinct frequencies such that when the beams are caused to interfere, at least two ultrasonic holograms are formed, each capable of rendering a distinct image of the object.

While my invention is distinctly described in the appended claims, an understanding of some of the various embodiments of my invention will be gained with reference to the following specification and the accompanying figures, in which:

BRIEF DESCRIPTION OF THE DRAWINGS

FIG. 7 shows a block diagram of an ultrasonic holographic image monitoring TV system according to the present invention;

DETAILED DESCRIPTION OF THE DRAWINGS

Figure 1:
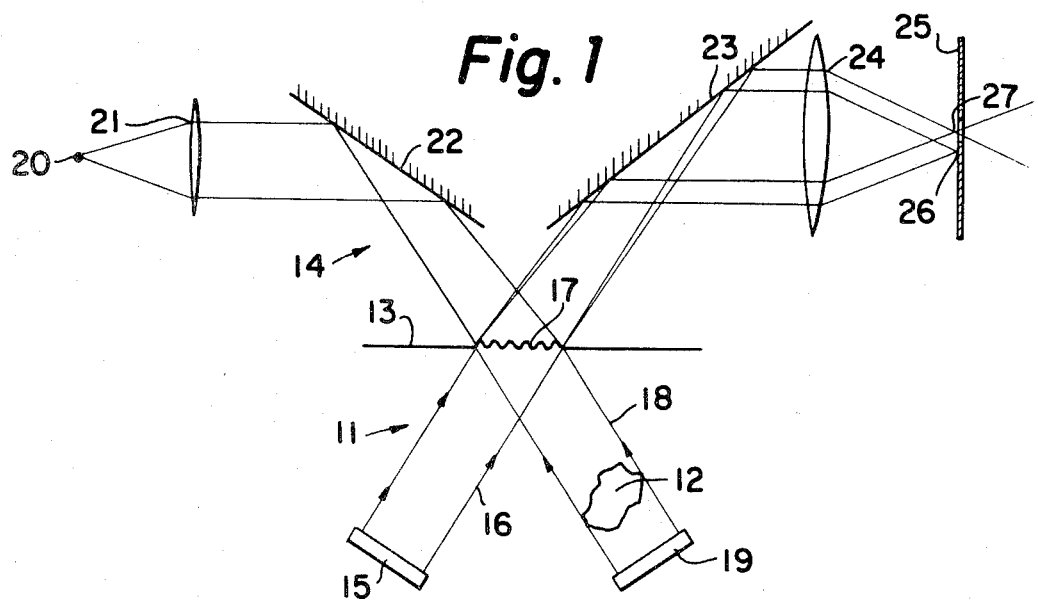
FIG. 1 is a diagram showing one embodiment of ultrasonic holography according to the invention of the referred to copending patent application and of which the present invention represents an improvement.
Figure 1A:
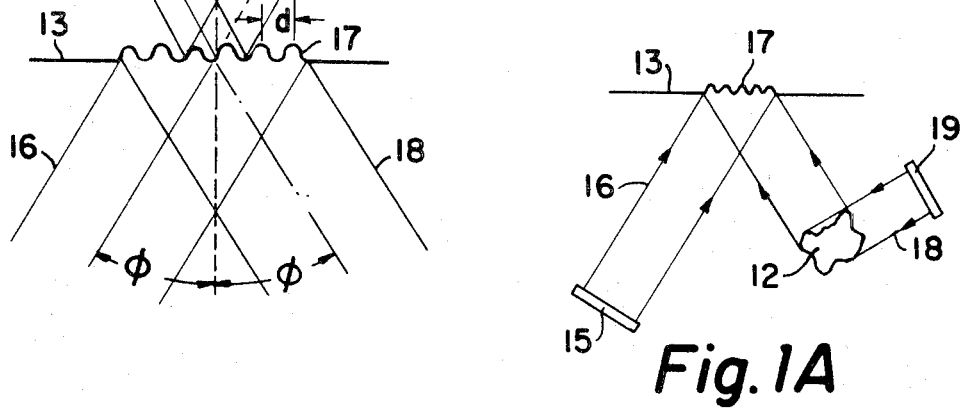
FIG. 1A shows a slight modification of the embodiment shown in FIG. 1.

Referring now to FIG. 1, according to the invention of ultrasonic holography, in one embodiment thereof, a first fluid medium 11, which may comprise water, includes within its interior an object 12 of which an ultrasonic hologram is to be made. The surface 13 of the fluid medium 11, indicated by a line in FIG. 1, represents the interface between the fluid medium 11 and a second fluid medium 14 which may, in the simplest embodiment of this invention, comprise air. An ultrasonic transducer 15 lying within the first fluid medium 11 produces an ultrasonic beam 16 directed toward the interface 13 and intersects the interface at a position generally indicated by the reference numeral 17. A second ultrasonic beam 18 is produced by transducer 19 lying angularly disposed to transducer 15 within the medium 11. The beam 18 is mutually coherent with respect to the beam 16 and intersects the beam 16 at a position including the surface area 17 of the interface 13. This second beam 18 is directed to impinge upon th object 12 under inspection so that the wavefront of the beam 18 is modulated in accordance with the ultrasound distortion variations characteristic of the object 12. As shown in FIG. 1, the beam 18 is transmitted through the object; however, this is not to say that by reflecting the beam 18 off the object 12 and then creating the interference pattern with the reflected wave, as illustrated in FIG. 1A, similar results could not be obtained. But, due to practical difficulties, it is presently more desirable to use transmitted rather than reflected ultrasonic radiation, although the invention in its broadest sense contemplates the use of either. By virtue of the fact that the beams 16 and 18 are mutually coherent, and in accordanc with the principles of ultrasonic holography, an interference pattern will form at the area 17 of the interface 13, which pattern includes the information necessary to reconstruct the wavefront of the beam 18 coming from the object 12. The interference pattern takes the form of a standing wave pattern and comprises an ultrasonic hologram which, by illuminating with coherent light, reconstructs an image of the object 12 that is carried in a first order diffracted beam.

In carrying out the reconstruction in one embodiment, a point source of coherent electromagnetic radiation 20, which electromagnetic radiation may be visible light, is directed through a collimating lens 21 and then to the surface area 17 of the interface 13 by means of a reflecting mirror 22. The interference pattern at the interface area 17 forms a standing wave which reflects and diffracts the radiation from the point source 20 into several diffracted orders of beams whose wavefronts correspond to the wavefronts emanating from the object 12 and carried by the ultrasonic beam 18. Each diffracted order of the electromagnetic radiation beam is reflected by a mirror 23 through a lens 24 which focuses them to points. These diffracted orders are then blocked by a spatial filter 25, all except a first order diffracted beam which is allowed to pass. In the embodiment shown in FIG. 1 the zero order beam is focused to a point by the lens 24 and is represented by reference numeral 26. This zero order beam 26 is shown blocked by the spatial filter 25. A positive or negative sideband first order beam, represented by the focus point 27, is shown allowed to pass through the spatial filter 25. It will be understood that the spatial filter 25 is constructed to block all but one first order sideband of the several orders of diffracted beams and not merely the zero order beam as shown in FIG. 1. The accepted first order beam 27 carries an image of the original object 12 which may be viewed by any suitable optical system. In the embodiment described in FIG. 1, the standing wave pattern 17 generated at the interface 13 is the hologram used for reconstructing the image. It will be understood, however, that instead of directly using this standing wave pattern to reconstruct the image, a photograph may be taken of this standing wave pattern and used to produce a transparency which is then the hologram which is used for reconstructing the image. In this latter situation, a permanent hologram is obtained, whereas in the former situation, described with respect to FIG. 1, the standing wave pattern hologram is only temporary and lasts only so long as the transducers 15 and 19 are being driven. Additionally, the utilization of a photographic film to make a permanent record hologram allows for reduction or enlargement of the hologram by ordinary photographic techniques, thereby enabling enlarged or reduced images of the object to be porduced. However, by utilizing the standing wave pattern at the interface 17 as the hologram, the image of the object may be viewed in real time.

Figure 2:
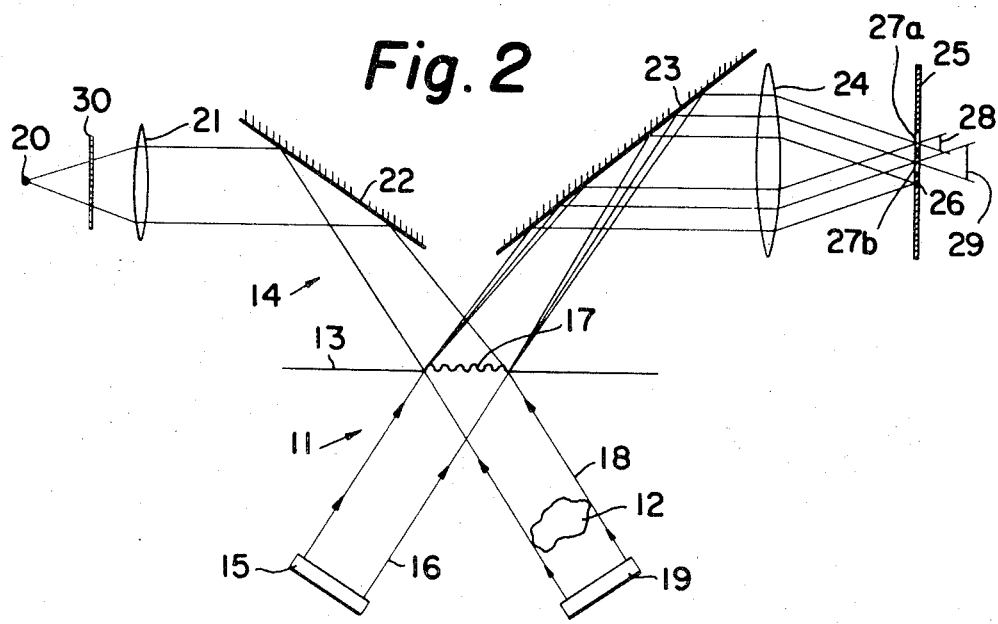
FIG. 2 is a diagram showing one embodiment of the present invention.

Referring now to FIG. 2, the present invention in one embodiment thereof is represented and, as will be apparent, is an extension and an improvement of the embodiment shown in FIG. 1. For this reason, apparatus and other features common to both the embodiments of FIGS. 1 and 2 are given like reference numerals. In FIG. 2, the ultrasonic beams 16 and 18 are caused to vary from one frequency to another by means of operating the transducers 15 and 19 at different ultrasonic frequencies. Specifically, the transducers 15 and 19 are operated at one frequency for a period of time and then at a second frequency for another period of time. There may be a delay between the operation at one frequency and at the second frequency and there also may be succeeding third and fourth, etc., frequencies utilized. However, in describing the embodiment of FIG. 2, for the sake of clarity, only two different operating frequencies will be described.

By operating the transducers in this manner, two different standing wave patterns, each associated with one ultrasonic frequency, appear at the interface surface 17, each for the period of time that the transducers are operating at their respective frequencies. After the transducers are switched from the first frequency into the second operating frequency, the second standing wave pattern, characteristic of the second frequency is formed at the interface 17. If the switching is made fast enough, the inherent delay of the human eye is such that the resulting images formed appear substantially simultaneously in time Reconstruction of the images from the standing wave patterns formed at the interface 17 may be carried out with the same equipment as used in the embodiment of FIG. 1. A point source of electromagnetic radiation 20, which may be white light, is collimated by a lens 21 and then reflected by means of a mirror 22 to the interface area 17. The illuminating light is then diffracted into several orders by the hologram surface at 17. Since different frequencies were used to make different standing wave patterns at the surface 17, a plurality of pairs of positive and negative first order sideband image-carrying beams will be formed, each pair corresponding to the different respective ultrasonic frequency used. The different first order sideband beams will be displaced from each other in space at spacings corresponding to the ultrasonic frequencies being used and the wavelength of the electromagnetic radiation 20 used to illuminate the standing wave patterns 17. Thus, the several diffracted orders are reflected by means of mirrors 23 through a focusing lens 24 to a spatial filter 25 which blocks all orders, such as the illustrated zero order beam 26, except for certain accepted first order sideband beams. Two images, 28 and 29, are shown carried in two accepted first order sideband beams, 27a and 27b, respectively. A suitable optical viewing system (not shown), such as a telescope, may contain a beam shifting device such as a prism, to bring the images 28 and 29 into registered to form a composite image. Although suitable optical viewing systems will be described in more detail hereinafter with reference to FIGS. 7, 8 and 9, suffice to say that the viewing system must be one in which the different images are appropriately magnified so that they are all the same size and so that they all come together in space to form a composite image. By providing the spatial filter 25 with different colored filters, the images 28 and 29 will be of different colors, so that the composite image may be distinguished between the image carried in the accepted first order beam of one ultrasonic frequency and that of other ultrasonic frequency. Alternatively, colored images may be obtained by synchronizing a color filter wheel 30 in front of the source 20, with the switching of the transducers 15 and 19.

One advantage of the above technique is seen in an example where the transducers 15 and 19 were first operated at 3 mHz. and then at 9 mHz. for periods of 30 microseconds with a 500 microsecond delay between 30 microsecond pulses. The object 12, which may be a biological specimen of which the interior (which may be of varying density) is desired to be imaged, is penetrated better with the longer wavelength 3 mHz. ultrasonic beam, but an image of higher resolution is formed when impinged upon by the higher frequency 9 mHz. ultrasonic radiation. The utilization of beams of ultrasonic radiation of both frequencies allows the more dense part of the object to be imaged by the low frequency ultrasound while obtaining good resolution by the high frequency ultrasound of the less dense parts. By appropriately filtering monochromatic light from the source 20, such as by means of the colored filter wheel 30, a separate color may be given each accepted diffracted first order sideband beam. This color selectivity may be also achieved by appropriately providing the spatial filter 25 with colored filters so that it passes only one color of light when ultrasonic radiation of one frequency is used and another color of light when ultrasonic radiation of another frequency is used. By this means, the more dense part of the object will be of one color and the less dense part another.

Figure 2A:
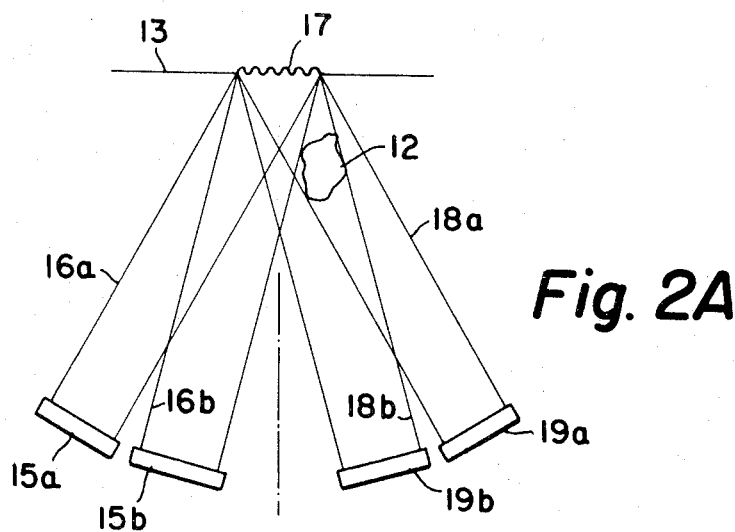
FIG. 2A is a diagram showing another embodiment of the present invention.

Another way to obtain successive standing wave patterns at the interface 13 is to provide a plurality of sets of transducers, each set acting to produce a single standing wave pattern at a distinct ultrasonic frequency and the energization for the transducers being switched successively from one to another. Such a method is illustrated in FIG. 2A, in which a pair of transducers 19a and 19b are positioned at different angular relationships with respect to each other, such that they produce a pair of ultrasonic beams 18a and 18b which intersect the object 12 on their way to the interface 13. Likewise, a second pair of angularly displaced transducers 15a and 15b are positioned to produce reference beams 16a and 16b to interfere at the interface 13 with beams 18a and 18b, without passing through the object 12. With this arrangement, rather than pulsing the transducers first at one frequency and then another, one set of transducers, for instance, transducers 19a and 15a, may be pulsed at one ultrasonic frequency for one instant of time and then a second set of transducers, 19b and 15b, may be pulsed at a second ultrasonic frequency at a second instant of time. As with respect to the arrangement of FIG. 2, the arrangement just described with respect to FIG. 2A produces succesive standing wave patterns at the position 17 of the interface 13, which may be utilized to produce a plurality of images in the same manner as described with respect to FIG. 2.

In both methods described (FIGS. 2 and 2A) it has been found desirable to make the angle between the object beam 18 and the normal to the interface 13 equal to the angle between the respective reference beam 16 and the normal to the interface 13. Where the intensity of the reference and object beams are equal at the interface 13, the symmetrical arrangement of object and reference beams has been found to cancel out undesirable lateral components of the forces produced in the system by the ultrasonic energy. The sideways or lateral component of the forces at the interface 13 depend upon the angles of incidence and the intensities of the reference and object beams. The lateral force equals $I \sin \phi$ where $I$ equals the intensity of each beam at the interface and $\phi$ equals the angle of the beam with the normal to the interface. It is possible to balance these forces by appropriately controlling the angle of incidence and the beam intensities. The beam intensities can be adjusted by adjusting the intensity of the transducer sources or by attenuating the beam intensity, for example, by passing the beam through material which absorbs some of the sound energy or by displacing the ultrasonic source at an appropriate distance from the detector so that the beam is at the desired intensity at the detector plane. As can be seen in FIGS. 2 and 2A, with a symmetrical arrangement, the respective pairs of transducers are shown at approximately equal distances from the interface 13.

Figure 2B:
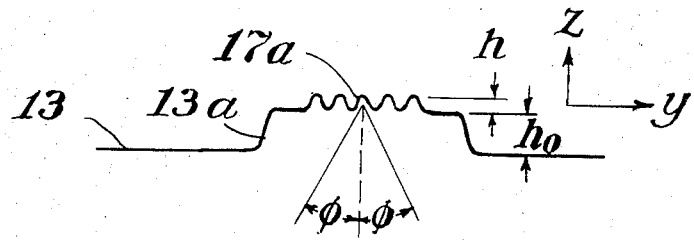
FIG. 2B is an enlarged view helpful in illustrating an important principle of the present invention.

The arrangement depicted in FIG. 2A is more advantageous than that depicted in FIG. 2, in one sense, since the angle between a particular pair of transducers and the normal to the interface 13 may be chosen, giving regard to the particular ultrasonic frequency produced by those transducers. Why this is advantageous will become more apparent with reference to FIG. 2B, which is an enlarged cross-sectional view of the interface 13. FIG. 2B shows a D.C. plateau of fluid 13a produced by the ultrasonic energy incident on the interface 13. Along the top of the D.C. plateau 13a is a standing wave pattern 17a which comprises the ultrasonic hologram as described heretofore. Assuming a symmetrical relationship between reference and object ultrasonic beams, FIG. 2B shows the angles $\phi$ at which the respective reference and object ultrasonic beams impinge upon the interface 13 to produce both the D.C. plateau 13a and the standing wave pattern 17a. In order to gain a better understanding of the physical forces at work at the interface 13 and to understand the advantage of being able to choose the angle depending on the ultrasonic frequency, the following mathematical relationships, descriptive of the principles of ultrasonic holography, are set forth. It should be understood that the derivation of Equation 1 below has been carried out sufficiently to prove its validity; however, as this derivation yields nothing to the understanding of the present invention, it will not be inculded. Equation 1 defines the total height $z$ of the plateau 13a and a particular point on the standing wave pattern 17a in a direction normal to the plane of the interface 13.

$$z = h \cos^2 k'y + h_0 \quad (1)$$

where $h$ and $h_0$ are defined, as in FIG. 2B, to be:

$h$ = height of standing wave pattern
$h_0$ = height of plateau on which the standing wave pattern is formed
$k'$ = a constant which depends upon the ultrasonic frequency $\nu$, the ultrasonic velocity $c$, and the angle $\phi$.

The constant $k'$ has been shown to be:

$$k' = \frac{2\pi\nu}{c} \sin \phi \quad (2)$$

The components $h$ and $h_0$ have been shown to be:

$$h = \frac{4I}{\rho g c (1+b)} \quad (3)$$

and $$h_0 = \frac{2I}{\rho g c} \left( \frac{b}{1+b} \right) \quad (4)$$

respectively where $I$ = intensity of each ultrasonic beam,
$\rho$ = density of the fluid medium,
$g$ = acceleration of gravity, and
$b$ = another constant which can be expressed:

$$b = \frac{16\pi^2}{\rho g c^2} \gamma (\nu \sin \phi)^2 \quad (5)$$

where $\gamma$ = surface tension of the fluid.

Since the order of magnitude of $b$ is significantly greater than 1, the term $(1+b)$ in Equation 3 approximates $b$. Substituting Equation 5 into Equation 3 yields:

$$h = \frac{4I\rho g c^2}{\rho g c 16\pi^2 \gamma (\nu \sin \phi)^2} = \frac{K}{\nu^2 \sin^2 \phi} \quad (6)$$

In order to maximize the brightness of the image reconstructed from the ultrasonic hologram, it is necessary to maximize the peak height, $h$, of the standing wave pattern 17a. From Equation 6 it can be seen that by minimizing the angle $\phi$, brightness is maximized. Alternatively, it is sometimes desirable to view images by television means, thus requiring sufficient but constant brightness. Equation 6 shows that by holding the factor $\nu^2 \sin^2 \phi$ constant at a sufficiently low value (as can be done with the setup of FIG. 2A) this result can be achieved.

Rather than switching the excitation from one set of transducers, say 15a and 19a, to another set, say 15b and 19b, all of the transducers could remain on at the same time. In this case a complex ultrasonic hologram would be formed which, in addition to containing the desired niformation necessary to reconstruct the desired image in the desired colors, would contain undesirable information such as cross-talk between the different holograms. This cross-talk can be blocked, however, by appropriate design of the spatial filter, as will be pointed out more celarly hereinafter.

Another method of reconstructing images from the standing wave patern formed at the interface of the two fluids may be carried out by first recording this multiple standing wave pattern formed at the interface of the two by producing a hologram transparency of the standing wave pattern. This transparency is then illuminated with light to form the multiple images that correspond to the different ultrasonic frequencies.

A hologram transparency can be recorded as follows. The standing wave pattern at the ultrasonic hologram surface is illuminated with coherent light and the light that is reflected from the ultrasonic hologram surface is diffracted into two first-order beams corresponding to each ultrasonic frequency that is utilized in forming the ultrasonic complex hologram. Each of these diffracted beams carries an image of the object and is focused to a point by a lens onto a spatial filter. At the spatial filter, one of the image-carrying beams for each of the ultrasonic frequencies is selected for use as an "object" beam in a conventional optical hologram-forming process. The image-carrying beams are made to interfere with a reference beam of light which is coherent with the light used for illuminating the standing wave pattern, and this interference pattern is recorded by the photographic emulsion on the film in the camera to produce a hologram transparency. The reference beam utilized in this process may be derived by directing a portion of the illuminating light onto the photographic film to interfere with the image-carrying beams. On way of doing this is to use the zero order, or undiffracted beam, that is reflected from the ultrasonic hologram surface. Alternatively, one of the diffracted orders can be used as a reference beam, although this wavefront contains object information and would introduce noise in the reconstructed image. If pulsed sonic energy and/or a pulsed light source is utilized, as hereinbefore described, it should be carefully provided that a reference beam is present at the photographic film during the same period that an image-carrying beam is present in order to record an interference pattern of the desired object information contained therein. For instance, if the image-carrying beam results from a pulsed light source, the reference beam will have to be pulsed in synchronism therewith.

Figure 3:
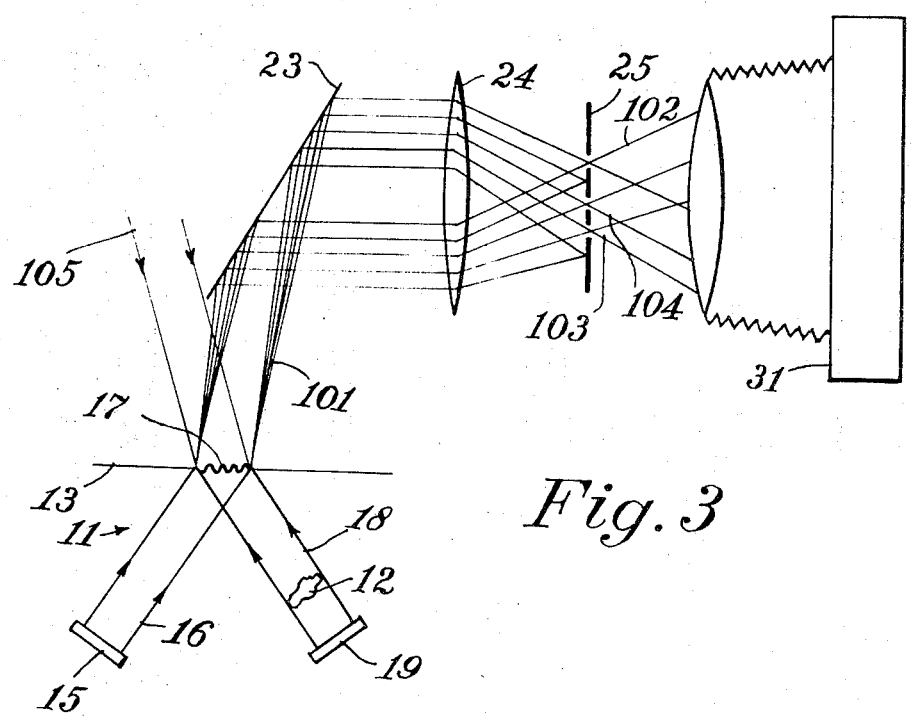
FIG. 3 is a diagram showing still another embodiment of the present invention.

FIG. 3 shows one method of recording the hologram transparency on the camera film utilizing the zero order light as the reference beam. In this figure it is assumed that the ultrasonic hologram 17 is composed of two standing wave patterns formed by two distinct ultrasonic frequencies. A beam of light 105 from a point coherent source (not shown) is directed upon the hologram surface 17. The light reflected from this surface is diffracted into two first-order beams for each of the two ultrasonic frequencies and is directed by the mirror 23 to a lens 24 which brings the various beams to a point focus on a spatial filter 25. The spatial filter is constructed so that the diffracted orders 102 and 103 are passed onto a photographic emulsion in the camera 31. These passed orders include a first-order diffracted beam for each of the two standing wave patterns which make up the ultrasonic hologram. The spatial filter 25 also allows the zero order beam 104 to fall upon the photographic emulsion and serve as a reference beam. In this way the photographic emulsion in the camera 31 records the interference pattern formed by the two pairs of interference beams to produce a hologram transparency which can be illuminated to produce the multiple images.

Figure 4:
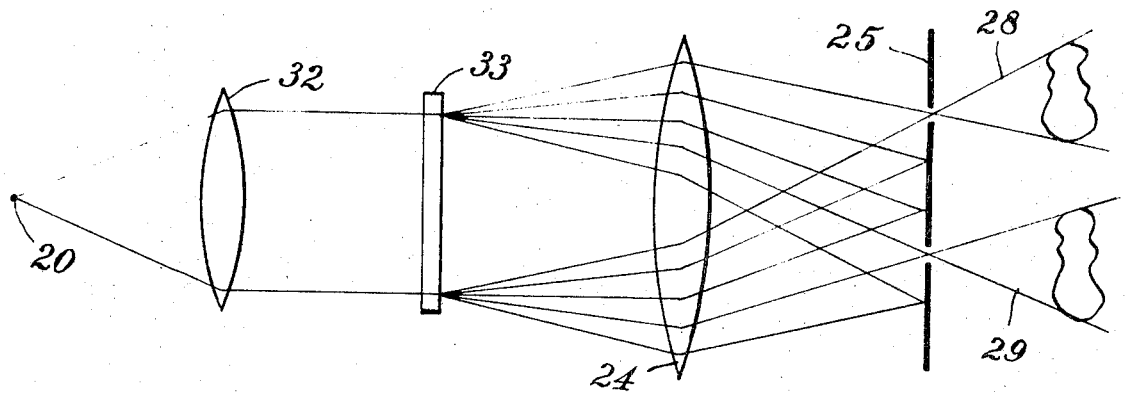
FIG. 4 is a diagram illustrating image reconstruction in ultrasonic holography according to this invention.

Referring now to FIG. 4, a reconstruction process is illustrated for forming images utilizing the hologram transparency prepared by means of the method described with respect to FIG. 3. In FIG. 4, an illuminating source 20 is collimated by a collimating lens 32 so that a beam of light illuminates a hologram transparency 33 formed by the method described with respect to FIG. 3. The transparency 33 diffracts light into several orders which are focused by lens 24 and then all but the desired orders 28 and 29 are blocked by the spatial filter 25. The images may be viewed by any suitable optical means (not shown).

Figure 5:
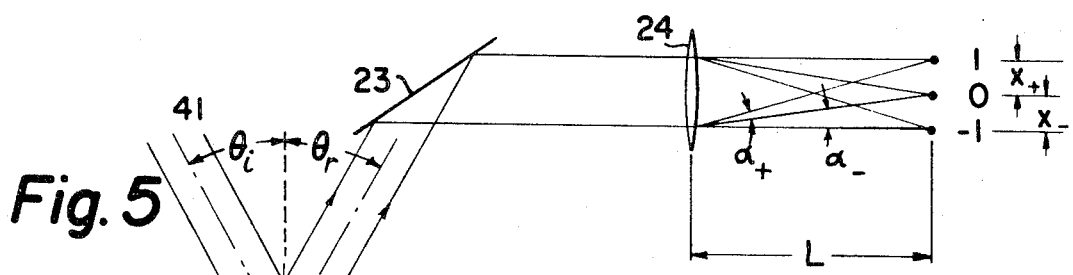
FIG. 5 is another enlarged view helpful in illustrating other important principles of the present invention.
Figure 6:
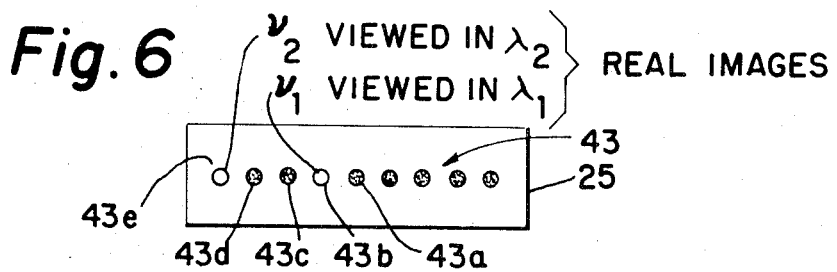
FIG. 6 illustrates a spatial filter designed according to the present invention.

The spatial filter 25 is designed to block all but the desired first order images. Since all the diffracted orders are displaced in space from each other, the filter 25 may comprise an opaque surface including holes for passing the desired orders, which holes are positioned and separated from each other by calculated amounts. Reference to FIGS. 5 and 6 will illustrate the necessary design of the spatial filter 25.

FIG. 5 shows an enlarged view of the standing wave pattern 17 at the interface 13. Ultrasonic waves 16 and 18 are shown incident at equal but opposite angles $\phi$ from the normal to the interface 13. Illuminating light rays 41 are shown incident to and reflected from the standing wave pattern 17 at angles $\theta_i$ and $\theta_r$, respectively. The standing wave pattern 17 comprises a diffraction surface including maximum and minimum peaks separated at distance $d$, which distance may be expressed in terms of the angles of incidence of the ultrasonic waves 16 and 18, the frequency of the ultrasonic waves 16 and 18 and the speed of the ultrasonic waves through the medium in which they travel. It has been determined that the mathematical expression for the distance $d$ between peaks of the diffraction surface 17 can be expressed as follows:

$$d = c/2\nu \sin \phi \quad (7)$$

where $c$ equals the velocity of the ultrasonic waves in the fluid medium, $\nu$ equals the ultrasonic frequency of the ultrasonic waves.

From this expression of the diffraction spacing, the angles $\theta_r$ of the various diffracted orders may be determined. The light rays incident on the diffraction surface 17 at an angle of incidence $\theta_i$ are diffracted according to the following relationship:

$$\sin \theta_r = \frac{m\lambda}{d} - \sin \theta_i \quad (8)$$

where $m$ is an integer representing the order of the diffracted light and $\lambda$ is the wavelength of the incident light.

Substituting Equation 7 into Equation 8 the reflected angles may be determined by the following relationship:

$$\sin \theta_r = \frac{2m\lambda\nu \sin \phi}{c} - \sin \theta_i \quad (9)$$

since $\nu$, $\phi$, and $c$ are constants for any given standing wave pattern, Equation 9 may be written as follows:

$$\sin \theta_r = Km\lambda - \sin \theta_i \quad (10)$$

or $$\theta_r = \sin^{-1}\{Km\lambda - \sin \theta_i\} \quad (11)$$

By substituting in the integers 0, 1, 2, etc. the angular spacings of the various diffracted orders can be determined from this relationship.

It will be apparent from Expression 11 that the zero order diffracted beam will be diffracted at an angle $\theta_i$. The first order diffracted beams will be separated from the zero order beam at angular deviations to either side of the zero order diffracted beam. If the diffraction angle of the zero order beam is termed $\theta_0$ and the diffraction angles of the first order diffracted beams are termed $\theta_{+1}$ and $\theta_{-1}$ respectively the angular deviations of the first order beams from the zero order beam can be expressed in terms of these angles. Specifically, the angular deviation $\alpha$, of one of the first order beams, for instance, the one diffracted at $\theta_{+1}$, is:

$$\alpha_{+1} = \theta_0 - \theta_{+1} \quad (12)$$

The angular deviation of the other first order diffracted beam is:

$$\alpha_{-1} = \theta_{-1} - \theta_0 \quad (13)$$

Referring to FIG. 5, the diffracted orders of light are shown focused by a lens 24 to points in space representing the focused zero order and two first order diffracted beams. The angular deviations $\alpha_{+1}$ and $\alpha_{-1}$ of the first order beams from the zero order beam are illustrated in this figure. These angular deviations determine the linear separation of the diffracted orders from the zero order at the focal point of the lens 24, where the spatial filter 25 may be placed. This linear separation may be calculated as follows: Suppose the distance between the lens 24 and the focal plane is equal to L. The linear separation of the positive first order beam, $x_{+1}$ will be $\alpha_{+1}L$ and the linear separation of the negative first order, $x_{-1}$, will be $\alpha_{-1}L$, ($\alpha_{+1}$ is in radians). By calculating these linear separations for several diffracted orders, the spatial filter 25 can be designed.

Referring to FIG. 6, there is shown a spatial filter 25, including a plurality of reference locations 43 spaced at distances which may be determined as just described. The spatial filter 25 may comprise an opaque surface provided with pinholes at some of the reference locations 43 to allow the desired orders of light to pass therethrough. From the equations referred to above, it will be apparent that the linear positions of the focused first order diffracted beams depend in part upon the ultrasonic frequency utilized to form the standing wave pattern. Since more than one standing wave pattern is formed in succession with more than one ultrasonic frequency, according to the principles of this invention, it will be apparent that linearly spaced sets of first order images will be produced. The following example taken with reference to FIGS. 5 and 6 will illustrate this principle.

Assume that two ultrasonic frequencies $\nu_1$ and $\nu_2$ are used to form two standing wave patterns at the interface 17 in rapid succession. Assume further that an illuminating source 20 is caused to beam light upon the interface 17, including at least two different frequencies, $\lambda_1$ and $\lambda_2$. Under this set of circumstances, four pairs of first order diffracted beams will be produced to points by means of the lens 24. The spatial filter 25 may be positioned in the focal plane of the lens 24 and the positions 43 line up with the focused diffracted beams. In FIG. 6, the center of the spatial filter 25, at location point 43a, represents the focus of undiffracted radiation, or the zero order beam. This radiation is usually blocked, as it often hinders observation of the image. To each side of the zero order position 43a, four first order diffracted beams will be spaced, the beams on one side representing virtual images and the beams on the other side representing real images. Depending on the properties and applications of the system, either the real or the virtual images will be viewed, while the other is blocked. Assume, for example, that the left side of the spatial filter 25 is the real image side and is desired to be viewed. Thus the entire right-hand side of the filter is left opaque to block all of the virtual image carrying beams. Four first order diffracted beams carrying real images will be focused at the four left-hand position points 43b, 43c, 43d, and 43e. The beam focused at 43b carries an image of ultrasonic frequency $\nu_1$ wavefront with light of wavelength $\lambda_1$. The beam focused at 43c carries an image of ultrasonic frequency $\nu_1$ viewed with light of wavelength $\lambda_2$. Similarly, the beam at 43d carries an image of ultrasonic frequency $\nu_2$ viewed with light of wavelength $\lambda_1$ and that at 43e carries an image of ultrasonic frequency $\nu_2$ viewed with light of wavelength $\lambda_2$. Equation 7 will give the spacings of these four position points. By blocking position points 43c and 43d, the ultrasonic frequency image $\nu_1$ may be viewed in light of one wavelength $\lambda_1$, while the ultrasonic frequency $\nu_2$ may be viewed with light of another wavelength $\lambda_2$. The two passed images will be spaced apart but may be brought into register by any suitable means, such as by a prism. The spatial filter 25 may be designed to pass any combination of the diffracted beams and thus to select the color in which each image will be rendered. It is apparent that the spatial filter, being opaque, except for the desired pinholes, also solves the problem of spurious cross-talk between different ultrasonic holograms.

Referring to FIG. 7, a block diagram of a system utilized to detect internal tumors (such as cancer) is illustrated. The system illustrated includes a sequential pulse generator 46 connected to a pair of signal generators 47 and 48, (e.g. 9 mHz. and 3 mHz. respectively)

each of different ultrasonic frequencies, which are then connected together to a parallel combination of the transducers 15 and 19. Transducers 15 and 19 are symmetrically disposed within a fluid medium 11 (such as water) contained by a container 55. The transducers may be thin quartz plates designed to vibrate at a fundamental frequency of 3 mHz. and at a third harmonic frequency of 9 mHz. The signal generators 47 and 48 provide the signals to drive the transducers 15 and 19, which in turn produce ultrasonic waves that form different standing wave patterns or ultrasonic holograms at the interface 17. In this example, an object comprising a humand hand is placed in the ultrasonic beam of the transducer 19. The ultrasonic holograms are illuminated by a polychromatic source of light 20 which may comprise a mercury arc. The light source is collimated by a lens 21 and reflected to the standing wave pattern 17 by a mirror 22. The mirror 23 reflects the diffracted orders of light through a focusing lens 24 to a spatial filter 25, which blocks all but two desired first order beams, so that the different ultrasonic images 28 and 29 can be viewed in different colors. The images are brought into register by a pair of lens segments 44 and 45 and a prism 49 and the resultant composite image 50 is scanned by a vidicon tube 51 in a closed circuit TV system. By this system a doctor can, on the spot, detect a tumor 52 by viewing a TV monitor 53.

The pulse generator 46 may be set up to trigger the signal generators 47 and 48 every 1000 microseconds and the signal generators may deliver pulses 30 microseconds wide with a 500 microsecond delay between them. Thus, the transducers 15 and 19 may produce ultrasonic beams of different frequencies at 500 microsecond intervals. This switching rate has been found to render multiple images which appear simultaneously to the observer. With appropriate color filtering arrangement, as described previously, the multiple images 28 and 29 may be viewed in different colors. Since the ultrasonic holograms are in existence for only 30 $\mu$s. for every 500 $\mu$s., it has been found desirable to include a shutter 54 in the light path to block the illumination at times during which no standing wave appears at the interface 17. The shutter 54 is shown connected to the pulse generator 46 for synchronization therewith. The shutter 54 may also include a color filter means for providing different colors for the different images.

Figure 8:
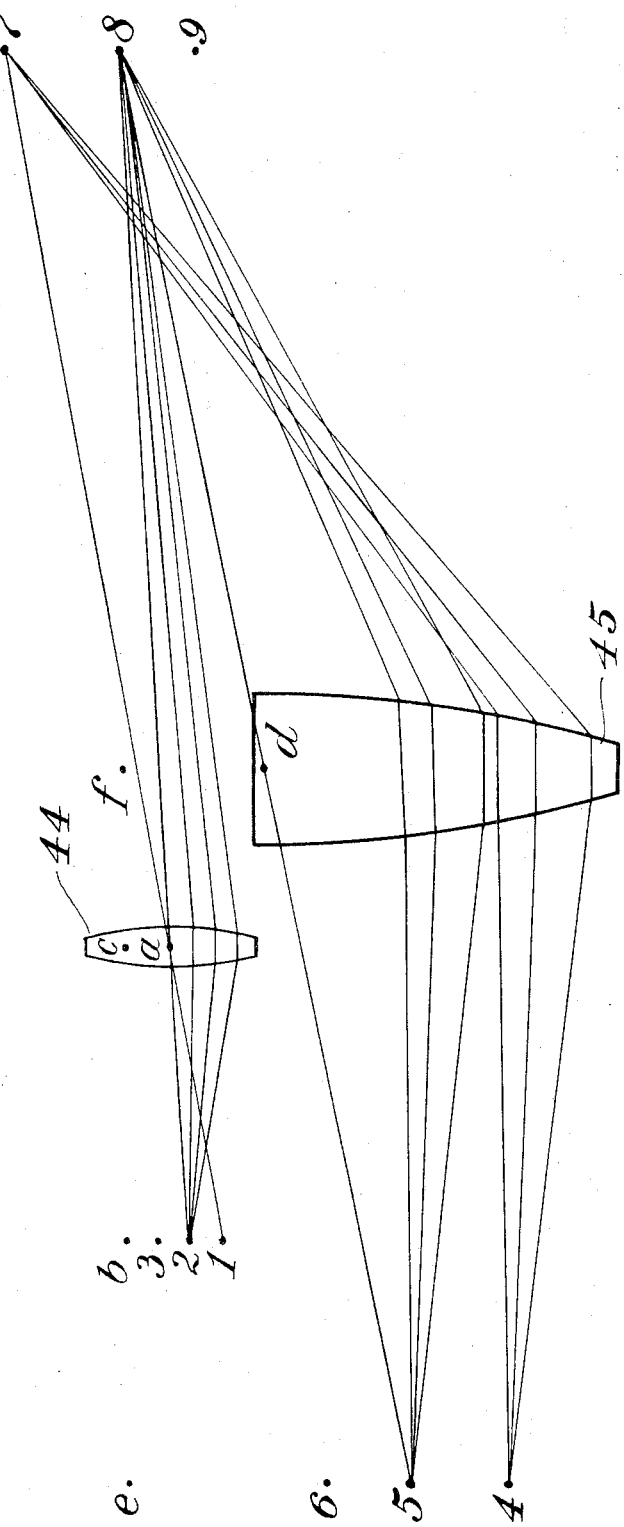
FIG. 8 is an enlargement of a portion of FIG. 7 showing a preferred image registration optical system.

A preferred optical system for bringing the images 28 and 29 into register to form a multicolored composite image 50 is shown on an enlarged scale in FIG. 8. The optical system of FIG. 8 is slightly modified from that of FIG. 7 to illustrate how, in a preferred arrangement, the prism 49 may be eliminated. FIG. 8 shows two wavefront reconstructed images with central and extreme image points labeled 1, 2, and 3 and 4, 5, and 6, respectively. The image which includes points 1, 2, and 3 will be assumed to be that image formed with the lower of the two ultrasonic frequencies used to form the hologram and the image including the points 4, 5, and 6 will be assumed to be produced with the higher of the two ultrasonic frequencies. Thus, the image 1, 2, and 3 is smaller than the image 4, 5, and 6, the differences in size being related to the ratio of the two ultrasonic frequencies. Each ultrasonic image is demagnified by the ratio of the wavelength of the light used to render the image to the wavelength of the ultrasound. It is therefore apparent that the images, in order to form a composite image, must be appropriately magnified; thus the ratio of the magnification factors for each image is approximately inversely proportional to the ratio of the ultrasonic frequencies used to form the images.

In FIG. 8 it will be assumed that it is desired to form a composite image which will contain extreme and central points 7, 8, and 9. Points 1 and 4 will be imaged at point 7, points 2 and 5 at point 8, and points 3 and 6 at point 9. The following analysis will illustrate how, by appropriate choice and positioning of the two lens segments 44 and 45, the composite image including the points 7, 8, and 9 can be formed without the utilization of a beam shifting prism.

The effective optical center "a" of the lens segment 44 must be on a line connecting points 2 and 8. The center "a" must also lie on the line connecting points 3 and 9 and on the line connecting points 1 and 7. Furthermore, if the point "d" lies in the same plane as the points 1, 2, and 3, and if point "c" lies in the unit plane of the lens 44, the focal length "f" of lens 44 will be given by:

$$\frac{1}{f} = \frac{1}{u} + \frac{1}{u'}$$

where $u$ is the distance between points "b" and "c" and $u'$ is the distance between points "c" and 8. Lens segment 45 must have an effective optical center "d" on the line connecting points 5 and 8 and also on the lines connecting 4 and 7 and points 6 and 9, respectively. The focal length of the lens 45 is given by the same equation as lens 44 with the exception that $u$ is taken to be the distance between points "e" and "f," two points lying in the plane of the image 4, 5, and 6 and the unit plane of the lens 45 respectively; and $u'$ is taken to be the distance between points "f" and 8.

Each image point is formed by a cone of rays, three of which are indicated for points 2, 4, and 5. As will be recognized by those skilled in the art of optics, the effective optical center of the lens is in reality not a single point, but rather two points situated to the right and left of the points "a" and "d" indicated to be the optical centers of the lens segments 44 and 45, respectively. However, this refinement in the theory of lenses is small and the equations given may be considered correct to a first degree of accuracy.

Figure 9:
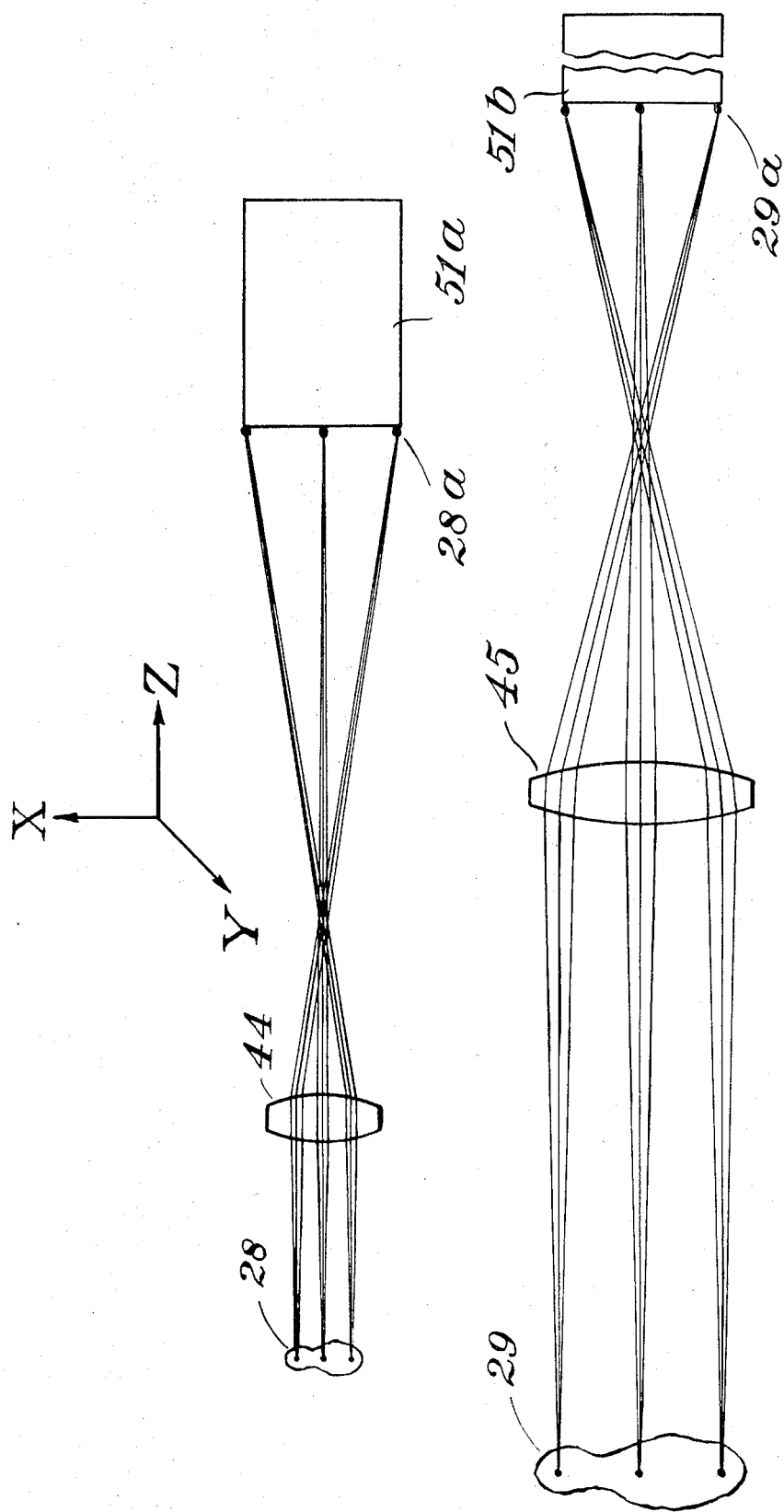
FIG. 9 shows an alternative image registration system.

Referring to FIG. 9, an alternative arrangement for bringing the two images into register is depicted. The different ultrasonic images may be focused on separate camera tubes 51a and 51b. Perfect registry of the images 28 and 29 can be achieved on the television monitor by adjusting lenses 44 and 45 and camera tubes 51a and 51b so that the secondary images 28a and 29a produced on the faces of camera tubes are the same size. In the example shown in FIG. 9, image 29 is three times as big as image 28. Lens 44 is positioned with respect to image 28 to produce image 28a at 3× magnification, whereas lens 45 operates at 1× magnification to produce image 29a. An infinite variety of combinations of lenses and magnifications are possible. Lens 44 might be adjusted to produce an image 28a which is 2× the size of image 28. Lens 45 would then be adjusted to yield ⅔× magnification. In each case the face of the camera tubes 51a and 51b would be positioned along the z-axis for best focus and along the x and y axes for best registry of the images as seen on the television monitor. Rotation of the camera tubes 51a and 51b about the z axis would also be necessary for bringing about perfect registry.

It will be apparent to those skilled in the art that more than two ultrasonic frequencies can be utilized and that different configurations of the ultrasonic imaging device may be substituted for the embodiments described. Also, the method of creating the different frequency images in different colors may be appropriately varied. Thus, I do not wish to be limited to the embodiments shown and described, but rather I desire to be limited only by the spirit and scope of the appended claims.

What is claimed is:

1. A method of producing a color optical image of an object illuminated with ultrasonic energy of at least two frequencies, comprising the steps of:
    forming on a detecting surface an off-axis hologram of a first ultrasonic energy wavefront after modification by the object and having a first frequency,
    forming on said detecting surface a second off-axis hologram of a second ultrasonic energy wavefront after modification by the object and having a second frequency, said first and second frequencies differing an amount large enough to bring about a significant difference in the object information carried by said first and second wavefronts, illuminating said detecting surface with light radiation from a point source to reconstruct from said first off-axis hologram a light wavefront in which an image of the object is reconstructed in one color and to reconstruct from said second off-axis hologram a light wavefront in which an image of the object is reconstructed in another distinct color, and simultaneously viewing in a superimposed relationship both distinct color optical images of the object.

2. In a method of practicing ultrasonic holography with an object which has at least one portion thereof with a significantly higher transmittance to ultrasonic energy of a first frequency than to ultrasonic energy of a higher second frequency, said object additionally having at least a second portion thereof with signficantly higher transmittance to ultrasonic energy of said second frequency than does said at least one object portion, a method of forming an optical image of the object comprising the steps of:

forming on a detecting surface a first off-axis hologram of a first ultrasonic energy wavefront of the first frequency after passing through the object, forming on said detecting surface a second off-axis hologrom of a second ultrasonic energy wavefront of the higher second frequency after passing through the object, illuminating said detecting surface with light radiation from a point source to reconstruct from said first of-axis hologram a light wavefront in which an image of the object is reconstructed in one color and to reconstruct from said second off-axis hologram a light wavefront in which an image of the object is reconstructed in another distinct color, and simultaneously viewing both of said distinct color optical images of the object in a superimposed relationship to each other, whereby a multicolored image of the object is viewed.

3. In a method of practicing ultrasonic holography with an object which has at least one portion thereof with a significantly higher transmittance to ultrasonic energy of a first frequency than to ultrasonic energy of a higher second frequency, said object additionally having at least a second portion thereof with significantly higher transmittance to ultrasonic energy of said second frequency than does said at least one object portion, a method of forming an optical image of the object comprising the steps of:

forming on a detecting surface a first off-axis hologram of a first ultrasonic energy wavefront of the first frequency after passing through the object, forming on said detecting surface a second off-axis hologram of a second ultrasonic energy wavefront of the higher second frequency after passing through the object, illuminating said detecting surface with light radiation from a point source to reconstruct from said first off-axis hologram a light wavefront in which a first image of the object is formed and to reconstruct from said second off-axis hologram a light wavefront in which a second image of the object is formed, and registerng said first and second images to form a composite optical image of the object, whereby the composite image shows information of the object obtained from its high transmittance to the first ultrasonic energy wavefront as well as showing high resolution information of the object obtained by the second ultrasonic energy wavefront.

4. A method of forming a multiple ultrasonic hologram of an object, comprising the steps of:

directing a first beam of ultrasonic energy at a first frequency through said object positioned within an ultrasonic coupling medium and thence as a first object modified beam through the coupling medium to a detecting surface responsive to ultrasonic energy.

directing at least a second beam of ultrasonic energy at a second frequency through the object and thence as a second object modified beam through the coupling medium to the detecting surface, said first and second frequencies differing an amount large enough to bring about a significant difference in the object information carried by the said first and second object modified beams, directing through said coupling medium a first reference beam of ultrasonic energy mutually coherene with said first object illuminating beam, said first reference beam intersecting the first object modified beam at a finite angle therewith at the hologram detecting surface to form a first hologram, and directing through said coupling medium a second reference beam of ultrasonic energy mutually coherent with said second object illuminating beam, said second reference beam intersecting the second object modified beam at a finite angle therewith at the hologram detecting surface to form a second hologram overlapping the first hologram, whereby a multiple ultrasonic hologram is formed from which at least two optical images of the object may be reconstructed.

5. In a method of praciticing ultrasonic holography with an object which has at least one portion thereof with a significantly higher transmittance to ultrasonic energy of a first frequency than to ultrasonic energy of a higher second frequency, said object additionally having at least a second portion thereof with significantly higher transmittance to ultrasonic energy of said second frequency than does said at least one object portion, a method of frming a multiple ultrsonic hologram of the object comprising the steps of:

directing a first beam of ultrasonic energy at the first frequency through said object positioned within an ultrasonic coupling medium and thence as a first object modified beam through the coupling medium to a detecting surface responsive to ultrasonic energy, directing at least a second beam of ultrasonic energy at the second frequency through the object and thence as a second object modified beam through the coupling medium to the detecting surface, directing through said coupling medium a first reference beam of ultrasonic energy mutually coherent with said first object illuminating beam, said first reference beam intersecting the first object modified beam at a finite angle therewith at the hologram detecting surface to form a first hologram, and directing through said coupling medium a second reference beam of ultrasonic energy mutually coherent with said second object illuminating beam, said second reference beam intersecting the second object modified beam at a finite angle therewith at the hologram detecting surface to form a second hologram overlapping the first hologram, whereby a multiple ultsonic hologram is formed from which at least two optical images of the object may be reconstructed.

6. A method of producing a hologram with at least two distinct frequencies of ultrasonic energy and reconstructing images therefrom, comprising the steps of:

directing a first beam of ultrasonic energy of a first frequency through an object in an ultrasonic coupling medium and thence as a first object modified beam through the coupling medium to a detecting surface responsive to ultrasonic energy, directing a second beam of ultrasonic energy of a second frequency through the object and thence as a second object modified beam through the coupling medium to the detecting surface, the difference between said first and second frequencies being large enough to result in a significant difference in the degree of transmission of said first and second object illuminating beams through at least a portion of said object, directing through said coupling medium a first reference beam of ultrasonic energy mutually coherent with said first object illuminating beam, said first reference beam intersecting the first object modified beam at a finite angle therewith at the hologram detecting surface to form a first hologram, directing through said coupling medium a second reference beam of ultrasonic energy mutually coherent with said second object illuminating beam, said second reference beam intersecting the second object modified beam at a finite angle therewith at the hologram detecting surface to form a second hologram overlapping the first hologram, illuminating the overlapping holograms on the detecting surface with light radiation from a point source in a manner to form an undiffracted and various diffracted orders of light including a first object image carrying first-order diffracted beam from said first hologram and a second object image carrying first-order diffracted beam from said second hologram, blocking the undiffracted and all diffracted light beams except for said first and second diffracted beams, and registering the first and second images of the object, whereby a composite image is formed showing the features of said object as illuminated with ultrasonic energy of both first and second frequencies.

7. The method as defined by claim 6 wherein the illuminating radiation is polychromatic and wherein the step of blocking includes passing said first diffracted beam through a light filter of one color and passing said second diffracted beam through a light filter of another distinct color.

8. A method of producing a hologram with at least two distinct frequencies of ultrasonic energy and reconstructing images therefrom, comprising the steps of:

directing a first beam of ultrasonic energy of a first frequency through an object in an ultrasonic coupling medium and thence as a first object modified beam through the coupling medium to a detecting surface responsive to ultrasonic energy, directing a second beam of ultrasonic energy of a second frequenecy through the object and thence as a second object modified beam through the coupling medium to the detecting surface, the difference between said first and second frequencies being large enough to result in a significant difference in the degree of transmission of said first and second object illuminating beams through at least a portion of said object, directing through said coupling medium a first reference beam of ultrasonic energy mutually coherent with said first object illuminating beam, said first reference beam intersecting the first object modified beam at a finite angle therewith at the hologram detecting surface to form a first hologram, directing through said coupling medium a second reference beam of ultrasonic energy mutually coherent with said second object illuminating beam, said second reference beam intersecting the second object modified beam at a finite angle therewith at the hologram detecting surface to form a second hologram on the same area of the surface as the first hologram, operating the first object illuminating and reference ultrasonic beam pair in alternating time sequence with the second object illuminating and reference beam pair, thereby forming only one hologram on the detecting surface at any one instance, and illuminating the detecting surface with light radiation from a point source in a manner to reconstruct an optical image of said object from the first hologram in a first color and from the second standing wave pattern in a second color, said ultrasonic beam alternating time sequence having a frequency high enough to make each of the reconstructed images appear to be continuous.

9. The method as defined by claim 8 wherein the step of illuminating the detecting surface with light includes alternately illuminating said surface with light of said one color and said another color with the same frequency as said ultrasonic beam alternating sequence.

10. A method of producing a hologram with at least two distinct frequencies of ultrasonic energy and reconstructing images therefrom, comprising the steps of:

directing a first beam of ultrasonic energy of a first frequency to an object within an ultrasonic coupling medium and thence as a first object modified beam through the coupling medium to a detecting surface responsive to ultrasonic energy, directing a second beam of ultrasonic energy of a second frequency to the object and thence as a second object modified beam through the coupling medium to the detecting surface, said first and second frequencies differing an amount large enough to bring about a significant difference in the object information carried by said first and second object modified beams, directing through said coupling medium a first reference beam of ultrasonic energy mutually coherent with said first object illuminating beam, said first reference beam intersecting the first object modified beam at a finite angle therewith at the hologram detecting surface to form a first hologram, directing through said coupling medium a second reference beam of ultrasonic energy mutually coherent with said second object illuminating beam, said second reference beam intersecting the second object modified beam at a finite angle therewith at the hologram detecting surface to form a second hologram overlapping the first hologram, illuminating the overlapping holograms on the detecting surface with light radiation from a point source in a manner to form an undiffracted and various diffracted orders of light including a first object image carrying first-order diffracted beam from said first hologram and a second object image carrying first-order diffracted beam from said second hologram, and detecting an optical image of said object in each of said first and second diffracted beams, whereby said images may be compared to determine the interaction of said object with each of said first and second ultrasonic frequencies.

11. The method as defined by claim 10 wherein the step of detecting an optical image of said object in each of said first and second diffracted beams includes registering the images formed in each of said beams to form a composite optical image of the object.

12. The method as defined by claim 10 wherein the step of detecting an optical image of said object includes constructing an optical hologram with said first and second object image carrying first-order diffracted beams by blocking all diffracted light orders except for said first and second beams, and by exposing a photosensitive material to said first and second diffracted beams and the undiffracted beam, whereby the undiffracted beam acts as a reference to form an optical hologram on said photosensitive material.

13. The method as defined by claim 10 wherein said first object illuminating and reference ultrasonic beam pair is operated in alternating time sequence with said second object illuminating and reference ultrasonic beam pair, and wherein the step of illuminating the overlapping holograms on the detecting surface with light includes alternating said light radiation between two distinctive colors in synchronism with the ultrasonic beam operating sequence, the alternations occuring rapidly enough so that the optical images in each of said first and second diffracted beams appear to be continuous, whereby each of said image is rendered in one of said two distinctive colors.

14. The method as defined by claim 10 wherein said first and second object illuminating ultrasonic object beams are directed along a common path through the coupling medium to the object.

15. The method as defined in claim 10 wherein the step of detecting an optical image in each of said first and second diffracted beams includes blocking all of said undiffracted and diffracted light orders except for said first and second diffracted beams, and wherein the illuminating light radiation includes a plurality of distinct light frequencies, and further wherein each unblocked image rendered from said holograms is chosen to be rendered in light of a distinct frequency.

16. The method as defined in claim 15 wherein each of said first and second diffracted light orders is filtered so that each unblocked image is rendered in a mutually distinct color.

17. The method as defined in claim 15 wherein said illuminating light radiation is time sequentially filtered before illuminating said detecting surface with a plurality of substantially monochromatic light filters, thereby to render each object image in light of a distinct color.

18. The method as defined in claim 15 and further including the step of bringing into register all of the unblocked images wherein a composite image of different colors is produced.

19. A system for producing multiple optical images of an object, comprising:

means including at least one transducer for generating within an ultrasonic energy coupling medium a pair of mutually coherent ultrasonic beams in a direction to intersect each other at a finite angle at a detecting surface responsive to ultrasonic energy after one of said pair of beams passes through an object, said generating means capable upon excitation by an electrical signal of a proper frequency to generate any one of several distinct ultrasonic frequencies in the nature of a fundamental frequency or an odd harmonic thereof, means electrically connected to said generating means for alternately pulsing said generating means with at least two of said distinct ultrasonic frequencies, thereby to alternately form at said detecting surface at least two ultrasonic holograms of the object by different ultrasonic beam frequencies, means including at least one point light source for illuminating the detecting surface in a manner to produce at least one object image carrying first order diffracted beam from each of said holograms, means for causing each of said at least one object image carrying diffracted beam from each of said holograms to be substantially monochromatic and of a distinctive color from each other of said diffracted beams, and means for optically combining said diffracted beams and for registering the reconstructed optical images carried thereby.

20. The system according to claim 19 wherein said means for causing each of said at least one object carrying diffracted beam from each of said holograms to be substantially monochromatic includes means driven by said electrical pulsing means for illuminating the detecting surface with substantially monochromatic light alternating in color so that each of said first and second holograms is illuminated in a distinctive color.

References Cited
UNITED STATES PATENTS

| | | | |
|---|---|---|---|
| 2,832,214 | 4/1958 | Trommler | 73—67.6 |
| 3,400,363 | 9/1968 | Silverman | 340—3 |
| 3,444,316 | 5/1969 | Gerritsen | 178—6.5 |

OTHER REFERENCES

Leith et al.: Reconstructed wavefronts and communication theory, J.O.S.A., October 1962, pp. 1123–1130.

Leith et al.: Wavefront reconstruction with diffused illumination and three-dimensional objects, J.O.S.A., November 1964, pp. 1295–1301.

Leith et al.: Holograms: Their properties and uses, S.P.I.E. Journal, October/November 1965, pp. 3–6.

Mueller et al.: Sound holograms and optical reconstruction, applied physics letters, Nov. 1, 1966, pp. 328 and 329.

RICHARD C. QUEISSER, Primary Examiner

J. P. BEAUCHAMP, Assistant Examiner

U.S. Cl. X.R.

340—5; 350—3.5

PO-1050
(5/69)

UNITED STATES PATENT OFFICE
CERTIFICATE OF CORRECTION

Patent No. 3,564,904      Dated February 23, 1971

Inventor(s) B.B. Brenden et al

It is certified that error appears in the above-identified patent and that said Letters Patent are hereby corrected as shown below:

Column 7, line 9, the word "included" is misspelled;
    line 63, the first part of the word "information" is misspelled;
    line 68, the word "clearly" is misspelled;
    line 71, there is a "t" missing in the word "patt[ern]
    line 73, delete the words "formed at the interfac[e of] the two" and insert the following --on a photographic emuls[ion]
    line 74, delete the word "by" and insert the word --thereby--.

Column 8, line 58, change the word "interference" to --inte[r]

Column 10, line 3, change the equation "$x_{+1}$" to --$x_{\pm 1}$--.
    line 5, change the equation "($\alpha_{+1}$ is in radians) to --($\alpha_{\pm 1}$ is in radians)--.

IN THE CLAIMS:

Column 13, claim 3, line 66, correct the spelling of the wor[d] "registering".
Column 14, claim 4, line 14, correct the spelling of the wor[d] "coherent";
    claim 5, line 29, correct the spelling of the wor[d] "practicing";
    line 37, correct the spelling of the wor[d] "forming";
    line 61, correct the spelling of the wor[d] "ultrasonic".
Column 17, claim 17, line 23, correct the spelling of the wo[rd] "sequentially".

Signed and sealed this 4th day of January 1972.

(SEAL)
Attest:

EDWARD M. FLETCHER, JR.      ROBERT GOTTSCHALK